United States Patent [19]

Pone, Jr.

[11] 4,175,856
[45] Nov. 27, 1979

[54] PHOTOGRAPHIC PRINTER WITH AUTOMATIC DENSITY AND COLOR CORRECTIONS FOR PAPER GAMMA

[75] Inventor: John Pone, Jr., Minneapolis, Minn.

[73] Assignee: Pako Corporation, Minneapolis, Minn.

[21] Appl. No.: 848,739

[22] Filed: Nov. 4, 1977

[51] Int. Cl.² ............................................. G03B 27/78
[52] U.S. Cl. ...................................... 355/68; 355/77; 355/38
[58] Field of Search .............................. 355/38, 68–71, 355/83, 88, 77, 35–37, 67; 356/175, 202, 203, 404, 443, 444

[56] References Cited

U.S. PATENT DOCUMENTS

| | | | |
|---|---|---|---|
| 2,783,678 | 3/1957 | Andreas et al. | 355/66 |
| 2,880,662 | 4/1959 | Craig et al. | 355/81 |
| 3,051,069 | 8/1962 | Neale | 355/77 |
| 3,074,312 | 1/1963 | Olson | 356/202 |
| 3,096,176 | 7/1963 | Craig | 96/27 |
| 3,186,841 | 6/1965 | Berger et al. | 96/23 |
| 3,400,632 | 9/1968 | Wahli | 355/20 |
| 3,447,871 | 6/1969 | Neale | 355/38 |
| 3,497,611 | 2/1970 | Orthmann et al. | 355/38 |
| 3,531,199 | 9/1970 | Burger et al. | 355/83 |
| 3,753,707 | 8/1973 | Burger et al. | 96/27 |
| 3,768,903 | 10/1973 | Steinberger et al. | 355/38 |
| 3,873,199 | 3/1975 | Weinert | 355/88 X |
| 3,907,428 | 9/1975 | Norgaard et al. | 355/83 X |

Primary Examiner—L. T. Hix
Assistant Examiner—W. J. Brady
Attorney, Agent, or Firm—Kinney, Lange, Westman and Fairbairn

[57] ABSTRACT

The photographic printer of the present invention stores measured gamma values for the photosensitive medium upon which prints are to be made. The gamma values modify exposure times so that the operator button corrections always correspond to a known increment in density. When the photosensitive medium is changed, new gamma values are entered and the printer again modifies exposure times by the appropriate amount so that button correction increments remain constant despite the change in paper gamma.

5 Claims, 4 Drawing Figures

PHOTOGRAPHIC PRINTER WITH AUTOMATIC DENSITY AND COLOR CORRECTIONS FOR PAPER GAMMA

REFERENCE TO CO-PENDING APPLICATIONS

Reference is made to co-pending applications by F. Laciak and J. Poné Ser. No. 848,736 entitled "Exposure Time Control"; by J. Poné and P. Seidal Ser. No. 848,737 entitled "Photographic Printer with Automatic Slope Compensation"; and by J. Poné Ser. No. 848,738 entitled "Photographic Printer with Interactive Color Balancing", which were filed on even date and are assigned to the same assignee as the present application. These co-pending applications describe photographic printing systems which may use the gamma compensation of the present invention.

BACKGROUND OF THE INVENTION

The present invention relates to photographic printing systems. In particular, the present invention is an improved method and apparatus for use in a photographic printer which compensates exposure times based upon the gamma values of the photosensitive medium upon which prints are being made.

Photographic printers produce color or black and white prints or transparencies from photographic film originals (generally negatives). High intensity light is passed through the film and imaged on the photosensitive print medium (film or paper). The photographic emulsion layers on the print paper or film are exposed and subsequently processed to produce a print or transparency of the scene contained in the original.

A critical portion of a photographic printer is the exposure control, which controls the exposure of the photosensitive medium to ensure that the image on the photosensitive member is properly exposed. The exposure control may utilize inputs from several different sources in order to determine the proper exposure. For example, most automatic printers use large area transmission density (LATD) sensors to sample light transmitted by the negative either prior to or during the exposure. Control of the exposure is determined using a method known as "integration to grey". In addition, many automatic printers include an automatic density correction (ADC) or color/density scanning station whih scans the negative prior to printing and corrects the exposure in the event of a condition known as "subject failure". Finally, the operator may enter density correction signals from the operator control panel. Based upon some or all of these input signals, the exposure control determines the proper exposure for each of the color channels or for one black and white channel.

One characteristic of the photosensitive medium which affects exposure is the "gamma" of each photosensitive emulsion layer. Gamma denotes the slope of the linear portion of the "D log E curve", which is a plot of print density as a function of the $\log_{10}$ exposure. If gamma is 1, doubling the exposure increases the resulting density of the print by 0.3 density points. If gamma is greater than 1, doubling the exposure increases density by more than 0.3 density points. Conversely, if gamma is less than 1, doubling the exposure increases density by less than 0.3 density points. In other words, indentical changes in exposures of photosensitive media having different gamma values will result in different changes in densities.

Photofinishers generally attempt to buy photographic paper in large quantities so that the emulsions for the entire batch of paper are the same and, therefore, the gamma values do not change. When it becomes necessary, however, to change paper from one batch to another, the gamma values may be different. As a result, the density change resulting from the same exposure change may differ from one batch of paper to another.

The effects of variations in gamma can be significant in the operator-entered button corrections for overall density or for density for individual colors. In the prior art printers, a +1 button correction may vary anywhere from about 0.05 density points to about 0.15 density points. Some prior art printers permitted adjustment of the button increments by changing resistance values to pick the desired density increment for the buttons corresponding to an average gamma value. As the gamma values vary from this average value, of course, the density increments of the button corrections change.

SUMMARY OF THE INVENTION

The present invention is an improved printing system in which gamma values for the photosensitive medium are used to modify exposure. As a result, a correction increment from a correction button or from an automatic correction subsystem always corresponds to a known density increment despite variations in gamma values. The gamma compensation of the present invention provides more accurate control of exposure in a photographic printer than has been achieved in prior art printers.

DETAILED DESCRIPTION OF THE PREFERRED EMBODIMENT

The potographic printer of the present invention is unique in that color balance or color and density correction changes occur in actual specific density increments. The printer internally translates these desired incremental changes into the required changes to the print exposures. In this transformation, the gamma values of the photographic print paper must be known, since different gamma values result in different density changes even though the exposure change is the same.

Figure 1:
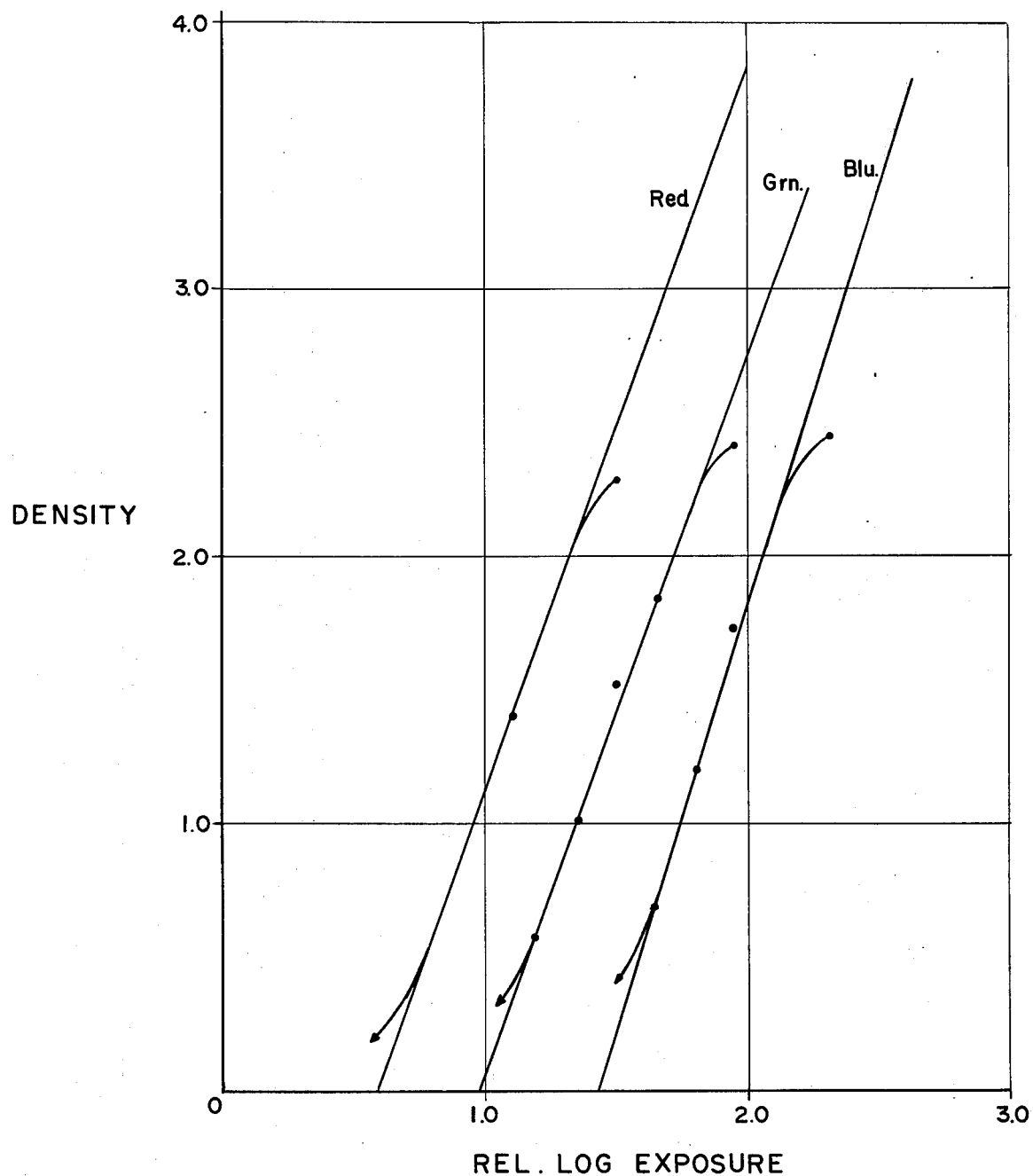
FIG. 1 is a graph showing density as a function of relative $\log_{10}$ exposure which illustrates the determination of gamma values of the photographic emulsions of a photographic print paper.

In the present invention, therefore, it is necessary to measure the paper gamma values of the specific print paper being used and to enter those values into the printer. To measure the gamma values, the user makes a photographic print of a step wedge, which is a negative or piece of film containing patches which vary by known density point increments, such as 0.15 density points. The user then measures the red, green, and blue densities of the resulting print and plots the results on a "D log E" chart similar to that shown in FIG. 1. A 0.15 density increment on the step wedge corresponds to a 0.15 difference in relative $\log_{10}$ exposure. In the chart shown in FIG. 1, density is plotted as a function of relative $\log_{10}$ exposure for each of the three photographic emulsions. The user then draws a straight line which best describes the "straight line portion" of each of the three curves. The slope of each line is the gamma for that emulsion layer, and may be defined by the relationship:

$$\gamma = \frac{D_{(2)} - D_{(1)}}{\text{Log } E_{(2)} - \text{Log } E_{(1)}}.$$

Once the gamma values are known, they are entered into the printer through an operator control panel, and the printer modifies the desired operator button corrections or automatic corrections as a function of the gamma values so that the same correction always represents the same density increment for whatever photographic paper is being used.

Figure 2:
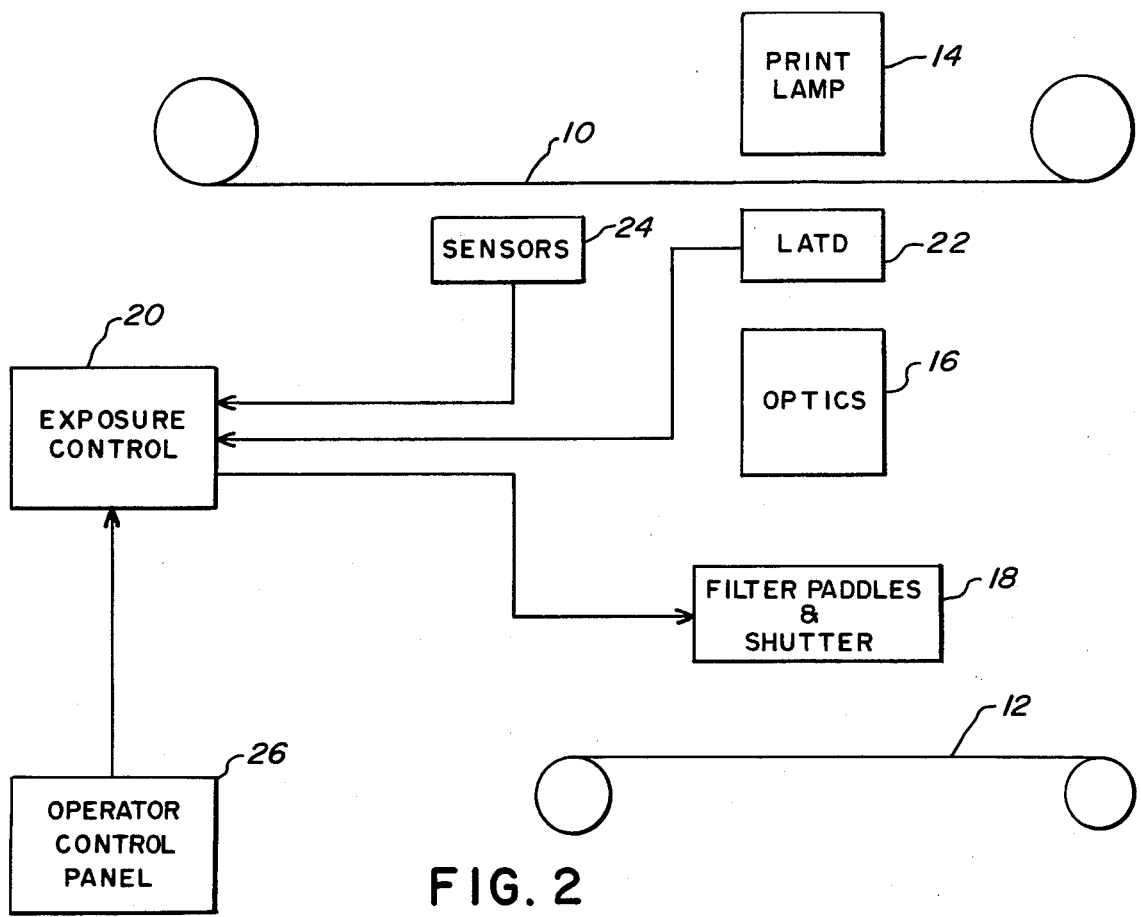
FIG. 2 is a block diagram illustrating a photographic printer.

FIG. 2 illustrates a photographic printer system which may use the gamma value compensation of the present invention. In this printer, an image contained in film 10 is printed onto the photosensitive paper 12. Light from print lamp 14 is passed through a frame of film 10 and is focused by optics 16 onto an appropriate portion of paper 12.

The exposure time during which paper 12 is exposed to the image from film 10 is determined by the position of filter paddles and shutter 18. The filter paddles typically include a subtractive filter for each color channel (red, green, and blue). Filter paddles and shutter 18 are controlled by exposure control 20.

In the embodiment shown in FIG. 2, exposure control 20 receives input signals from large area transmission density (LATD) sensors 22, from density or color sensors 24, and from operator control panel 26. Not all of these sources of input signals are required in every system, and similarly, other sources of input signals which affect the exposure time may be used in the printer. For example, when sensors 24 are color sensors, LATD sensors 22 may not be required, and the signals from sensors 24 may be used in place of the LATD signals.

In the present invention, exposure control 20 corrects color balance or color correction changes received from operator control panel 26, as well as automatic corrections based upon signals from sensors 24, as a function of the gamma values stored by exposure control 20, so that color balance or correction changes occur in specific density increments which are known and which will not vary despite changes in paper 12. The gamma values are entered into exposure control 20 by the operator through operator control panel 26.

Figure 3:
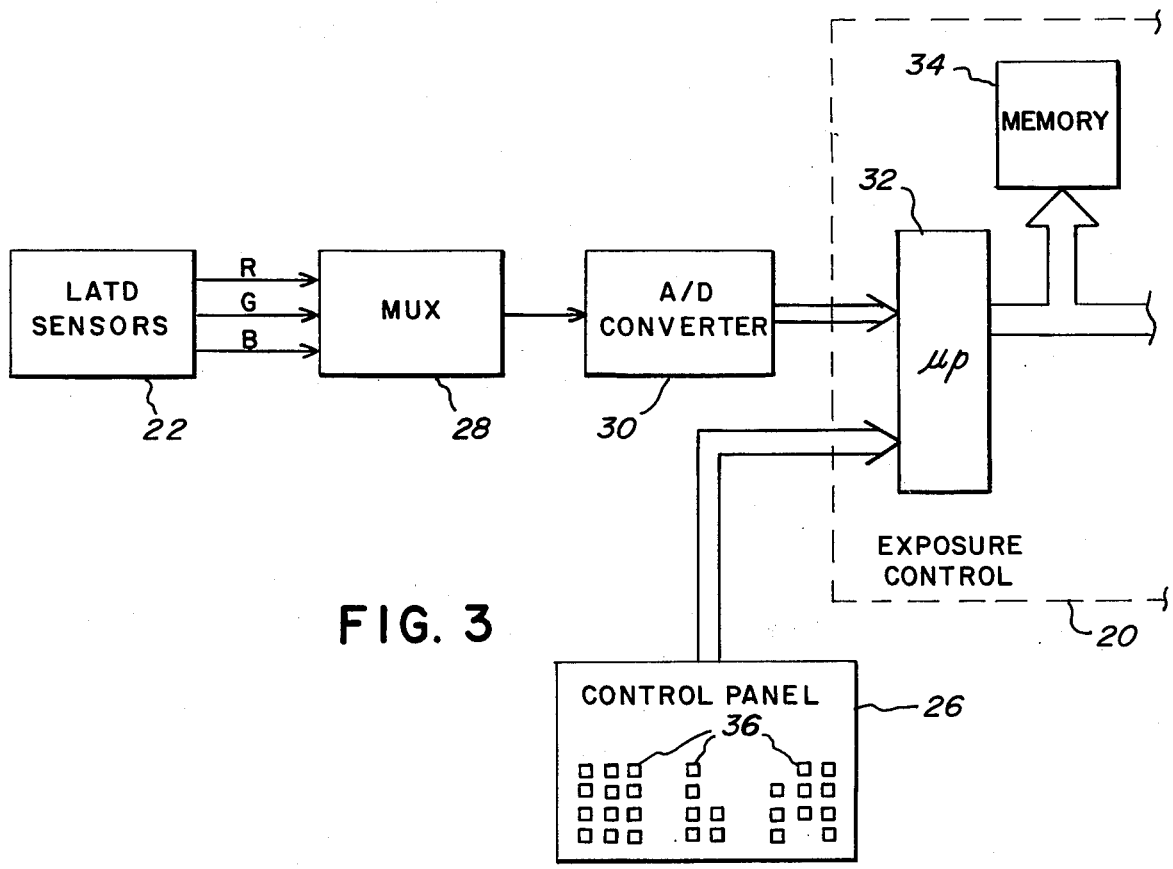
FIG. 3 is a block diagram illustrating in further detail a portion of the printer of FIG. 2.

FIG. 3 shows a more detailed view of a preferred embodiment of a portion of the printer shown in FIG. 2. In FIG. 3, the red, green, and blue signals from LATD sensors 22 are multiplexed by multiplexer 28, converted to digital signals by A/D converter 30, and supplied to a digital processor such as microprocessor 32 of exposure control 20. Also shown in FIG. 3 is memory 34, which is associated with microprocessor 32 and preferably includes both read only memory (ROM) and random access memory (RAM) storage. Other portions of the exposure control 20 are not shown in FIG. 3 because they are not critical to the description of the present invention. In one preferred embodiment, exposure control 20 is of the type described in a co-pending patent application Ser. No. 848,736 entitled "Exposure Time Control" by F. Laciak and J. Poné, Jr. filed on even date, and assigned to the same assignee as the present application.

FIG. 3 also shows a control panel 26 which includes a keyboard having operator controlled keys or buttons 36. The operator may enter various control and correction signals into exposure control 20 by means of the various buttons 36. Among the values or corrections which are supplied to microprocessor 32 from control panel 26 are the gamma values for the red, green, or blue emulsions of the particular photosensitive medium being used. These values are used by microprocessor 32 in deriving the desired exposure for each of the color channels.

Control panel 26 is also used to supply color and density button corrections to microprocessor 32. In one preferred embodiment, the density, red, green, and blue button corrections can range from −9 to +9. The present invention compensates or corrects the exposure changes for the gamma values, so that the specific density and color correction button increments and the automatic corrections are known incremental values which remain the same regardless of the photosensitive medium being used. Each time photosensitive paper is changed, new gamma values are supplied by the operator to microprocessor 32 so that the button or automatic correction increments can be maintained constant.

Figure 4:
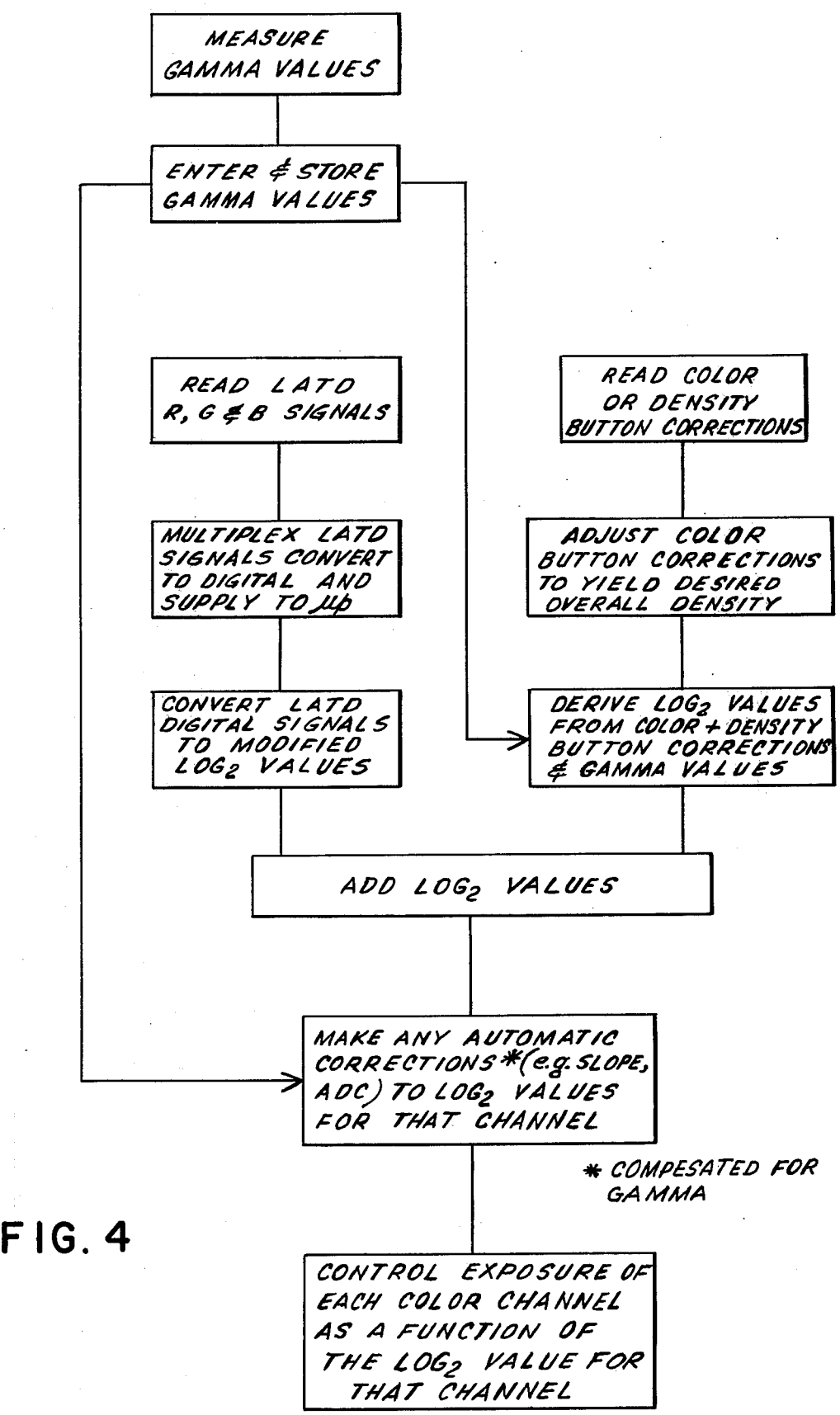
FIG. 4 illustrates the use of gamma values in correcting exposures in one preferred embodiment of the present invention.

FIG. 4 illustrates one method by which gamma values can be used to modify button and automatic corrections so that the specific button corrections selected by the operator and the automatic corrections made represent known increments regardless of what photosensitive paper is being used. In the embodiment shown in FIG. 4, the operator uses the procedure previously desribed, or some other procedure which yields gamma values for the photographic emulsion layers. These gamma values are entered into the printer and are ultimately used to correct exposure and compensate for the gamma values.

During normal operation, the operator may button in a specific color density correction, an overall density correction, or a combination of corrections. Microprocessor 32 reads the button corrections, determines what corrections are being called for and adjusts the corrections to yield the desired overall density. For example, if only a color button correction has been requested by the operator, the microprocessor 32 adjusts the correction values for all three colors so that the same overall density is maintained. For example, if a +red button correction is requested by the operator, microprocessor 32 will generate correction values which will decrease the red exposure and will increase the green and blue exposures so that the overall density of the print remains the same.

Microprocessor 32 then derives $\log_2$ values from the color and density button corrections and modifies these values to compensate for the gamma values of the three photographic emulsion layers. It is by the use of gamma in modifying the $\log_2$ values of the button corrections that the button increments can represent specific predetermined density changes even though the gamma values of the paper may differ.

During normal operation, the LATD signals from LATD sensors 22 are multiplexed by multiplexer 28, converted to digital signals by A/D converter 30, and supplied to microprocessor 32. Microprocessor 32 converts these LATD digital signals to modified $\log_2$ values and adds the modified $\log_2$ button correction values to the modified log$_2$ LATD values. Any additional corrections such as slope correction or automatic density or subject failure correction (called for by the outputs of sensors 24) are then made to the log$_2$ values. As in the case of button corrections, the automatic corrections are also compensated by gamma so that the same automatic correction always yields a known incremental density change.

The log$_2$ values are then used to derive signals which control the exposure for each color. When the exposure control is of the type described in the previously mentioned copending application entitled "Exposure Time Control", a time base value and a time count value are derived from the log$_2$ values for each color. The time base and time count values for each color are then used to control the exposure time of the corresponding color channel.

The gamma compensation of the present invention may also be used by the exposure control in any other operation in which gamma variations could yield incorrect results. In particular, the gamma compensation of the present invention has been used to advantage in set-up procedures for color balancing and slope determination.

In the previously mentioned co-pending application Ser. No. 848,738 entitled "Photographic Printer with Interactive Color Balancing", the gamma compensation of the present invention is preferably used in the interactive color balancing procedure. The gamma values are entered and stored in exposure control together with desired density values and exposure times for a reference negative. The operator performs an initial printing of the reference negative, measures the densities of the resulting print, and the measured density values from that initial print operation. Because the gamma values are known, the exposure control can precisely calculate and indicate to the operator the print lamp color changes which must occur to bring the next trial run right on or very close to the desired density values. The gamma compensation makes the interactive color balancing procedure more precise, because it causes the color balancing to be effectively independent of gamma.

Similarly, gamma compensation may preferably be used in the determination of slope from button corrections, as described in the previously mentioned co-pending application Ser. No. 848,737 entitled "Photographic Printer with Automatic Slope Compensation". Once again, because gamma values are known, the determination of the slope can be made extremely precise and independent of gamma.

In conclusion, the photographic printer of the present invention provides more accurate operation, particularly when corrections in color density or overall density are required, than has been possible with the prior art printers. This improved accuracy is a result of the use of measured gamma values of the photographic paper to compensate exposures so that each correction increment is a predetermined increment which remains the same even when photographic papers of different gamma values are used.

Although the present invention has been described with reference to preferred embodiments, workers skilled in the art will recognize that changes may be made in form and detail without departing from the spirit and scope of the invention. For example, although the present invention has been described in context of a specific exposure control, other exposure controls may utilize the gamma compensation techniques of the present invention as well.

What is claimed is:

1. A method of printing an image from a photographic original onto a photosensitive medium, the method comprising:
   storing gamma values of the photosensitive medium;
   measuring optical characteristics of a photographic original;
   supplying corrections to modify the density of the resulting scene on the photosensitive medium; and
   determining exposure of the photosensitive medium from the measured optical characteristics, the gamma values, and the corrections, the gamma values modifying the exposure to compensate for the gamma values of the photosensitive medium, wherein the gamma values modify the corrections to produce known density change increments irrespective of the gamma values of the photosensitive medium.

2. In a photographic printer for printing photographic images on a photographic medium, the improvement comprising:
   means for storing gamma values of the photosensitive medium;
   means for supplying correction signals indicative of desired incremental corrections in density; and
   means for modifying exposure in the printer as a function of the correction signals and the gamms values to produce the desired incremental corrections in density.

3. The improvement of claim 2 wherein the means for supplying correction signals comprises:
   operator control means for supplying operator selected correction signals.

4. The improvement of claim 2 wherein the means for supplying correction signals comprises:
   means for measuring optical characteristics of a photographic original to be printed; and
   automatic correction means for deriving automatic correction signals from the measured optical characteristics.

5. A method of printing an image from a photographic original onto a photosensitive medium having gamma values, the method comprising:
   measuring the gamma values of the photosensitive medium to be used;
   indicating desired incremental density corrections;
   using the gamma values and the desired incremental density corrections to produce exposure corrections which correspond to known density increments; and
   printing the scene on the photosensitive medium based upon exposure modified by the exposure corrections.

* * * * *